United States Patent
Tsaur

(10) Patent No.: US 7,167,502 B1
(45) Date of Patent: Jan. 23, 2007

(54) ZERO-OVERHEAD SYMBOL RATE ADAPTATION SYSTEM FOR OVSF CODE

(75) Inventor: Lih-Feng Tsaur, Irvine, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 1096 days.

(21) Appl. No.: 09/718,985

(22) Filed: Nov. 22, 2000

(51) Int. Cl.
  H04B 1/69 (2006.01)
  H04B 1/707 (2006.01)
  H04B 1/713 (2006.01)
  H04B 17/00 (2006.01)
  H04Q 1/20 (2006.01)

(52) U.S. Cl. ............... 375/130; 370/320; 375/225
(58) Field of Classification Search ............ 375/225
  See application file for complete search history.

(56) References Cited

U.S. PATENT DOCUMENTS 6,370,672 B1 * 4/2002 Rick et al. ............... 714/795
6,400,755 B1 * 6/2002 Harris et al. ............. 375/146
6,463,097 B1 * 10/2002 Held et al. ............... 375/225
6,466,566 B1 * 10/2002 De Gaudenzi et al. .... 370/342
6,574,289 B1 * 6/2003 Tran et al. ............... 375/341
6,658,076 B1 * 12/2003 Hayata .................... 375/377

\* cited by examiner

*Primary Examiner*—Stephen Chin
*Assistant Examiner*—Harry Vartanian

(57) ABSTRACT

A communication system transmits orthogonally encoded data at a symbol rate which is selected from a plurality of symbol rates. The data is encoded in a plurality of packets, each packet having a plurality of symbols having signal points in a field. The signal points of consecutively transmitted symbols are correlated unless the rate is changed, and the data is encoded such that only particular orthogonal descendants of a selected maximum rate code are used. The encoded data is transmitted to a receiver, and orthogonally decoded. A change in the rate of data transmission is recognized when the signal points of consecutively transmitted symbols are not correlated.

8 Claims, 12 Drawing Sheets

US 7,167,502 B1

ZERO-OVERHEAD SYMBOL RATE ADAPTATION SYSTEM FOR OVSF CODE

BACKGROUND OF THE INVENTION

1. Field of the Invention

This invention relates to digital cellular communication systems, and more particularly, to digital cellular communication systems where a receiving station adapts to the symbol rate of the transmitting station without consuming overhead.

2. Related Art

In cellular telephone systems, several conversations or other communications can take place simultaneously on a single carrier frequency. Interference between calls is avoided by multiplexing and/or encoding the signals for the various conversations, but cross-talk, in which one conversation spills into another conversation, is still a problem in such systems.

Orthogonal variable spreading factor (OVSF) codes have been adopted in third generation W-CDMA (wideband code division multiple access) wireless systems as channelization codes. One of the advantages is that the use of OVSF codes can reduce cross-talk, or multiple access interference (MAI), effectively.

Another advantage of OVSF codes is that OVSF codes can provide users with variable spreading length access and thus enable multi-rate adaptation. In other words, symbols having different lengths can be used at different times, depending on the circumstances. Multi-rate adaptation increases the capability of multimedia communication, which often has variable bit rate demand. Multi-rate adaptation also increases the ability to cope with time- and location-bearing conditions of the mobile, wireless channel environment.

Keeping the data transmission rate (chip rate) constant, a base station can use OVSF codes of different code lengths for transmitting symbols of different symbol duration. The received symbol's energy changes because energy is the product of power and the symbol duration (the OVSF code length in this case). MAI noise is unchanged because codes from different branches in the code tree are orthogonal irrespective of length. Therefore, the signal to noise ratio (SNR) or signal to information ratio (SIR) can be controlled effectively by applying an OVSF code of a particular length for a symbol, without suffering from MAI due to energy leakage from other channels.

This variable length characteristic provides stations the capability of increasing transmission efficiency by dynamically adjusting SNR or SIR and the symbol rate according to the channel environment and the quality of service (QoS) requirement of the application. However, the rate adaptation scheme must provide the receiver with a scheme for detecting the rate change.

Previous studies discussed rate adaptation using either rate information (RI) messages, or blind rate detection. Using RI messages consumes wireless resources, incurring additional overhead for rate adaptation. Since resources of wireless communication are limited, it is desirable to reduce the overhead needed for rate detection at the receiver.

To improve performance and reduce this overhead, a blind rate detection scheme using a Viterbi-decoder has been suggested. The variable-rate data can be block-encoded with a cyclic redundancy checksum (CRC) and then convolutionally encoded before being transmitted. The receiver, with the knowledge of possible bit rates, uses a Viterbi-decoder to retrieve the convolutional-coded frame data and compare it with the CRC to keep the packet's integrity. The receiver must know the possible end bit positions $\{n_{end}\}$ of coded frame data, and the trellis path of the soft decision Viterbi-decoder should end up at the zero state at the correct end bit position. The blind rate detection scheme works with fixed frame systems, in which coded data is placed in frames with a fixed time interval. If the source data rate is lower than the maximum transmission rate, however, only a partial frame is filled with data packets and the rest of the frame is empty (or idle). As a result, the transmission efficiency is not optimal due to the waste of slots in frames.

SUMMARY

This invention provides a communication system that transmits orthogonally encoded data at a symbol rate which is selected from a plurality of symbol rates. The data is encoded in a plurality of packets, each packet having a plurality of symbols having signal points in a field. The data is encoded by assigning a special set of OVSF codes (one code for each transmission rate) for each communication session. The special structure of the OVSF codes allows the receiver to detect changes in the symbol rate without overhead.

The codes are selected such that the signal points of consecutively transmitted symbols are correlated unless the rate is changed, and only particular orthogonal descendants of a selected maximum rate code are used for each communication session. The encoded data is transmitted to the receiver, and orthogonally decoded. A change in the rate of data transmission is recognized when the signal points of consecutively transmitted symbols are not correlated, or when symbol averaging produces an error symbol.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principals of the invention. Moreover, in the figures, like reference numerals designate corresponding parts throughout the different views.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

DETAILED DESCRIPTION

Figure 1:
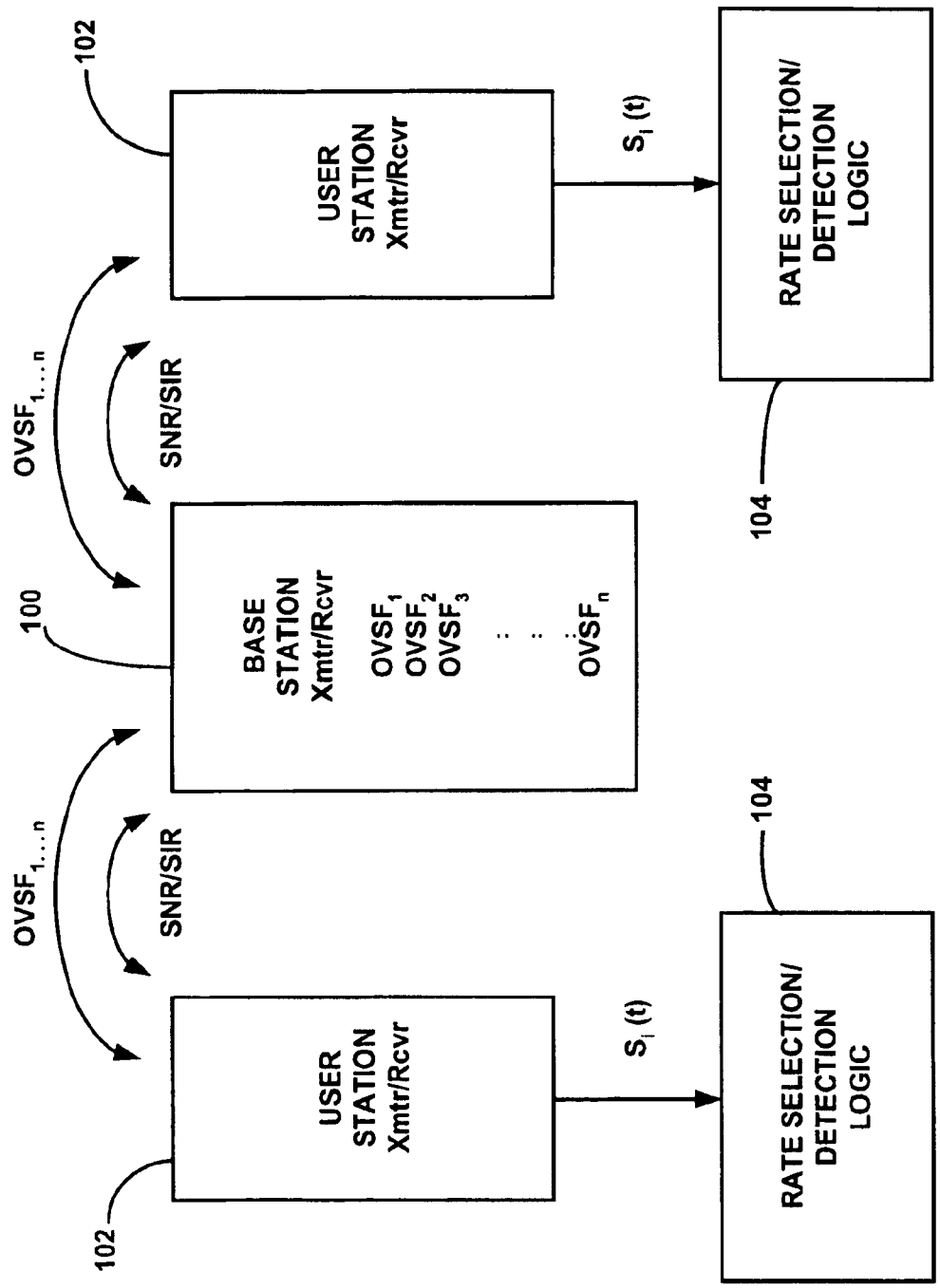
FIG. 1 is a block diagram of a communication system using OVSF codes from. which rate changes can be detected.

In FIG. 1, a system overview is illustrated. A typical digital cellular telephone system includes at least one base station 100 and at least two user stations 102 which can communicate with each other through the base station 100. The base station 100 and the user stations 102 each have a transmitter and receiver.

Figure 2:
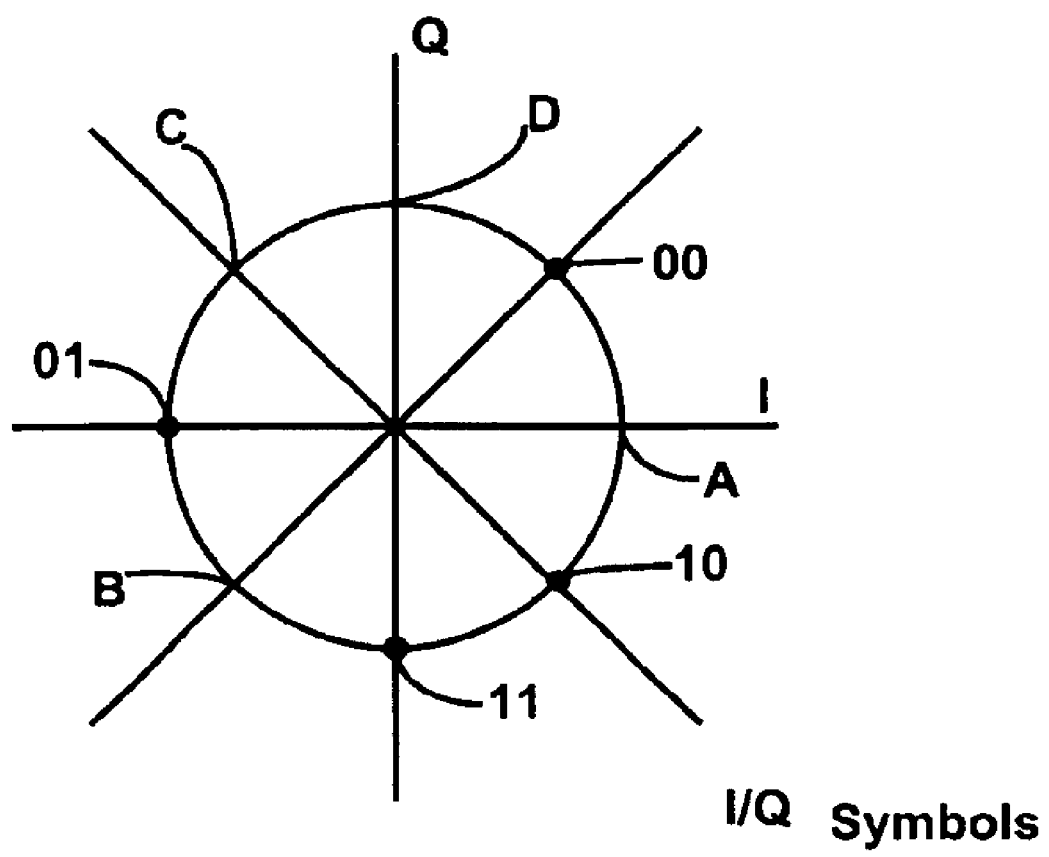
FIG. 2 is a diagram of signal points in an I-Q plane.

In one mode of operation, the base station 100 encodes analog signals such as voice communications or data communications digitally, for transmission to user station 102. The digital signal can be encoded in any one of several OVSF codes $OVSF_1$, $OVSF_2$, $OVSF_3$ . . . $OVSF_n$. The OVSF codes can be described mathematically as a series of signals points in an I-Q plane, shown in FIG. 2. In FIG. 2, for example, the signal points 00, 10, 11 and 01 are orthogonal to each other because they do not have signals points on the opposite points, i.e., A, B, C and D. These I-Q signal points are encoded according to a selected OVSF code. With this encoding scheme, several communication sessions can be conducted simultaneously on a single carrier frequency.

The information is encoded and transmitted in packets of a predetermined length. The length of the packets determines the symbol rate, or rate at which packets are transmitted. Thus, packets having a short length are sent at a relatively high symbol rate, and longer packets are sent at lower symbol rates.

In this mode of operation, the user stations 102 decodes the symbols $S_i$ sent from the base station 100, and uses rate selection/detection logic 104 to determine which OVSF code was used to encode the data. In addition to sending regular communications to the base station 100, the user stations 102 also sends information regarding the signal to noise ratio and signal to information ratio (SNR/SIR) of data which has been received.

A control channel is used to initially select a family of OVSF codes for use in a communication session. Depending on the SNR/SIR of previously sent signals, the base station 100 selects the optimum OVSF coding for future transmissions, and changes the OVSF code more or less on the fly as needed. The user stations 102 constantly detect the symbol rate, to recognize changes immediately.

Figure 3:
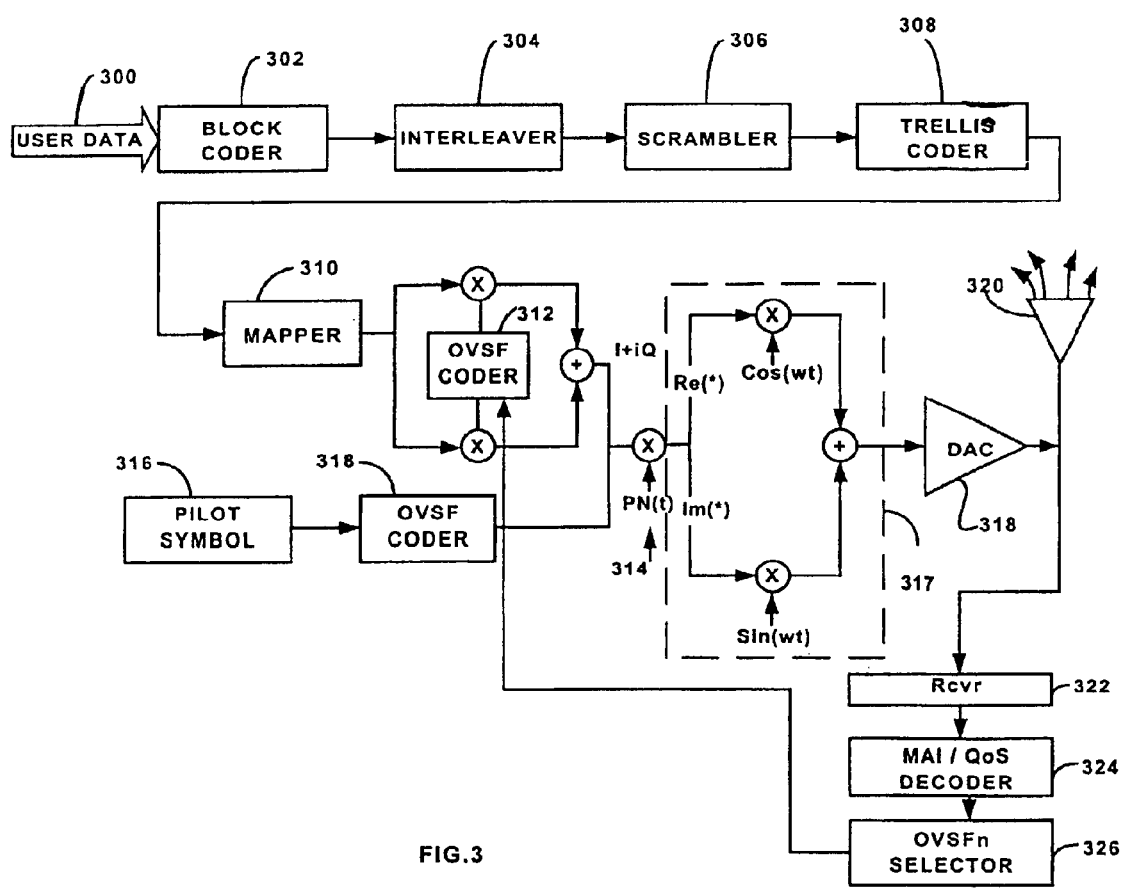
FIG. 3 is a more detailed block diagram of the transmitting system in a user station used in the communication system of FIG. 1.
Figure 4:
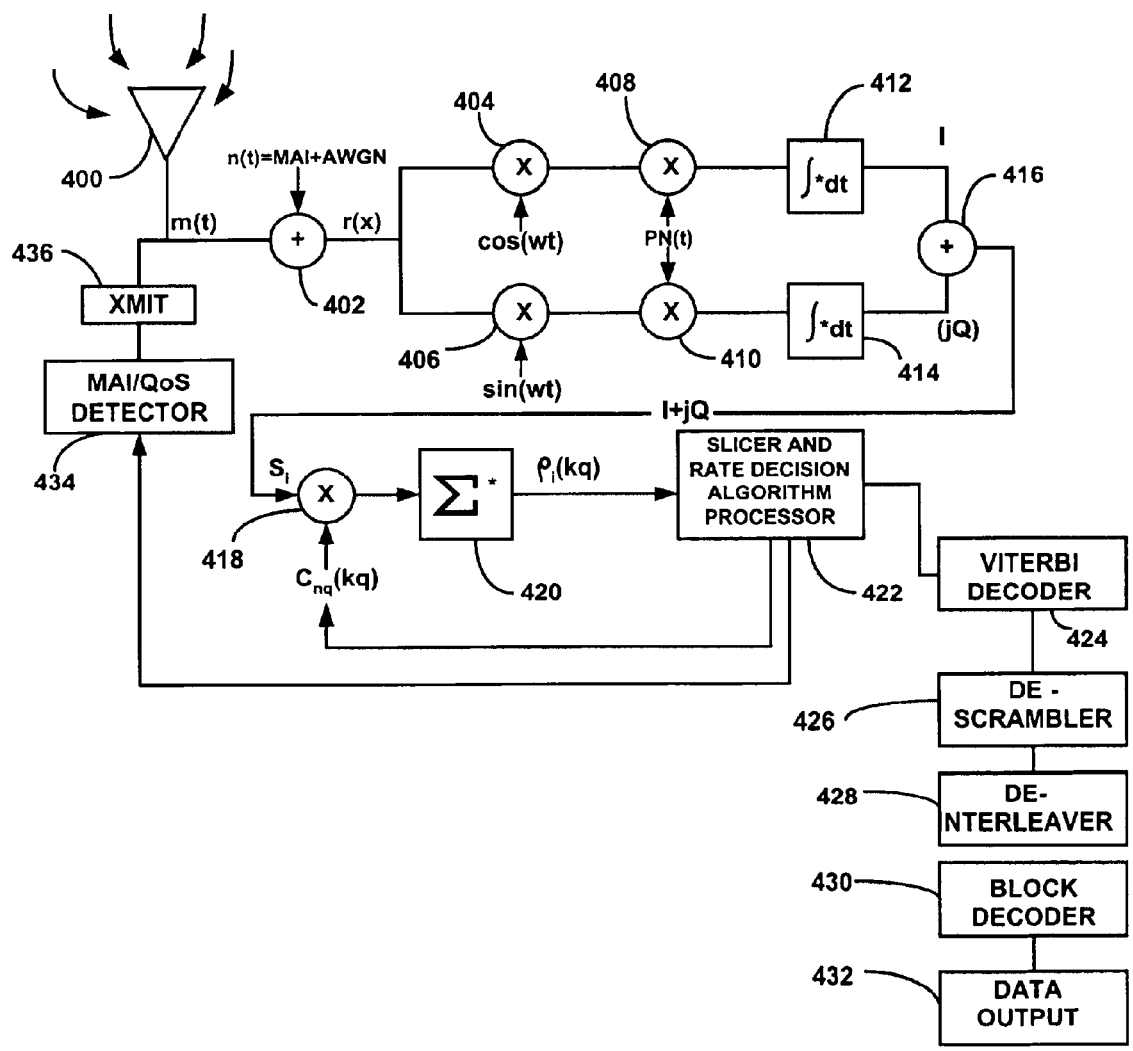
FIG. 4 is a more detailed block diagram of the receiving system in a user station used in the communication system of FIG. 1.

The system of FIG. 1 can be better understood with reference to FIGS. 3 and 4. User data 300 is channel coded in a block coder 302, interleaved in an interleaver 304, processed in a scrambler 306 and a trellis coder 308, and mapped to corresponding signals points on the I-Q plane in a mapper 310. The data 300 could include voice, video, data information or the like. Following mapper 310, each I and Q portion of the symbol is encoded by an OVSF coder 312 to keep orthogonality between channels. Output OVSF code packets are further spread by a pseudorandom noise (PN) circuit 314 to prevent MAI from other systems and adjacent cells in the cellular system.

Pilot symbols 316, which are separate from the data channel symbols, are separately coded by the longest OVSF code in another OVSF coder 318, and coded with the PN code in PN circuit 314. These pilot symbols define the boundary between adjacent symbols, and are used for fast cell searching and OVSF coding synchronization. The real and imaginary parts of the output of the PN circuit 314 are modulated and added in a modulator 317, and converted to an analog signal in a digital to analog converter 318. The RF output of converter 318 is transmitted through an antenna 320.

The MAI/QoS of the transmitted signals is detected by the receiving user station 102 and sent back to the transmitting base station 100. The transmitting base station 100 has a receiver 322 and an MAI/QoS decoder 324, which provides the MAI/QoS information to an $OVSF_n$ selector 326. The $OVSF_n$ selector 326 decides whether or not the OVSF code should be changed to produce a higher or lower symbol rate, and instructs the OVSF coder 312 accordingly.

At the receiving user station 102, the RF signal is received in a receiver antenna 400 (FIG. 4). The signal r(x) includes a message signal m(t) and noise n(t), made up of MAI and Added White Gaussian Noise (AWGN), as indicated at 402. The real and imaginary parts of the signal are demodulated and correlated in a real component demodulator 404 and an imaginary component demodulators 406, a real PN generator 408 and an imaginary PN generators 410, and a real integrator 412 and an imaginary integrator 414, to produce a symbol $S_j$, having an l component and a jQ component. The l and jQ components are added in an adder 416, and the l+jQ output (e.g. symbol $S_j$) is multiplied by a feedback signal $C_{nq}(kq)$ in a multiplier 418 where C is an orthogonal code symbol having a rate factor q. The output of the multiplier 418 is correlated in an accumulator 420 to produce a decoded signal $p_i(kq)$. The output of the circuit 420, decoded signal $p_i(kq)$, is fed to a slicer and rate decision algorithm circuit 422, which feeds a portion of the $C_{nq}(kq)$ signal back to the multiplier 418. The output of the circuit 422 provides an input to a Viterbi decoder 424, descrambler 426, de-interleaver 428, and block decoder 430, which decode the signal and produce the desired voice or data output 432.

The receiving user station 102 returns current SNR and/or SIR status to the transmitting base station 100 through the link's control channel. A multiple access interference (MAI)/quality of service (QOS) detector 434 determines SNR/SIR from the processor 422 and sends it to the transmitting base station 100 through the receiving station's user station transmitter 436. The transmitting base station's transmitter decides the optimal symbol rate based on this SNR/SIR information.

OVSF codes can be constructed from the Hadamard-Waish sequence using a tree structure method. According to the tree structure, there are $2^n$ codes at level n for notational purposes in FIG. 5, the subscript of the code symbol indicates the length of the code. Codes in the same level are numbered from 1 to $2^n$ as indicated in the parentheses. For instance, code $C_n(k)$ has length of n, and comes from the $k^{th}$ code from level $\log_2(n)$ of the tree, in which n is a power of 2.

Figure 5:
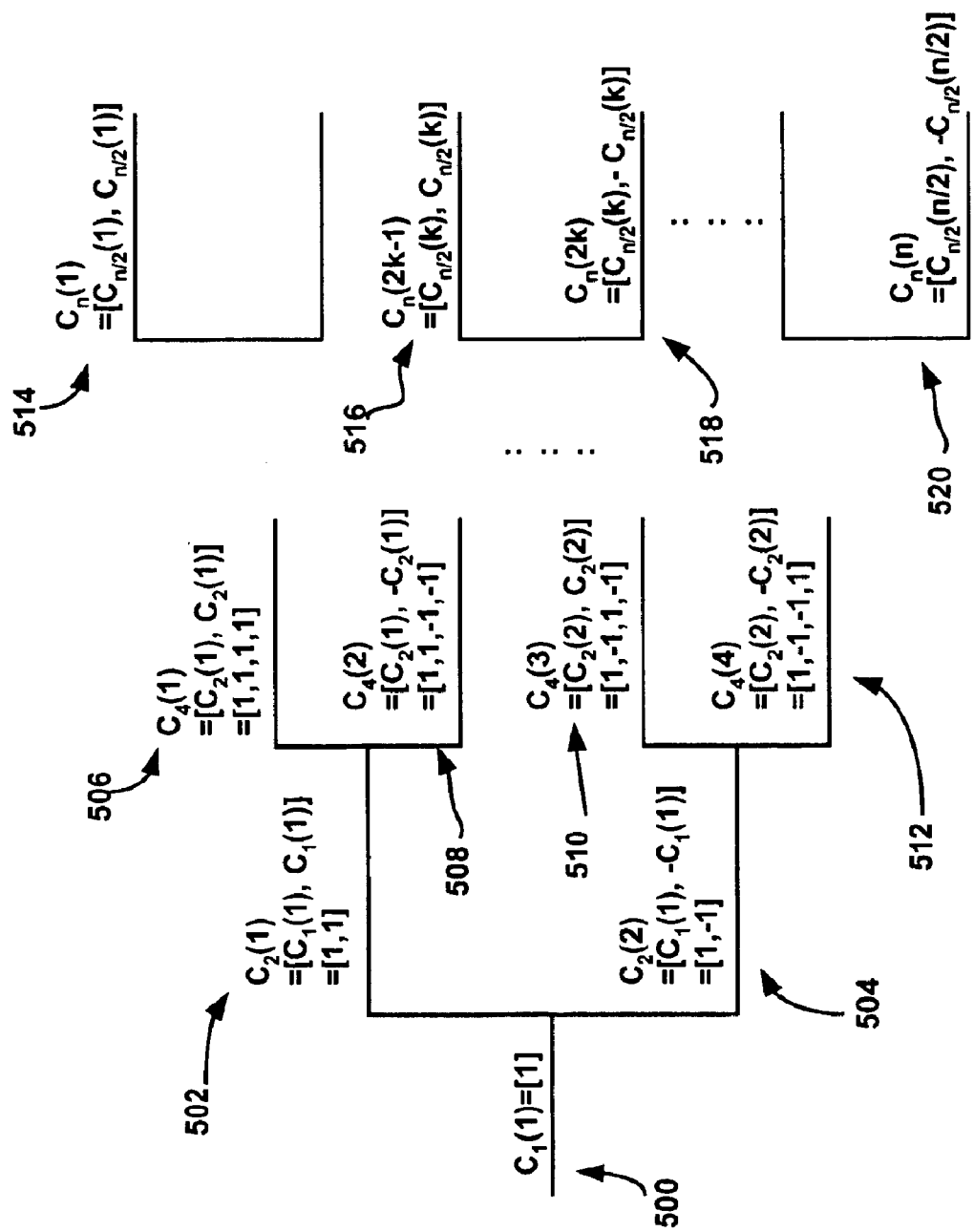
FIG. 5 is a diagram of a tree structure showing the method of constructing OVSF codes from the Hadamard-Walsh sequence.

A portion of such a tree structure is shown in FIG. 5. A code 500 has a length of 1, codes 502 and 504 have a length of 2, and codes 506, 508, 510 and 512 have a length of 4. Codes 514, 516, 518 and 520 have a length of n. These codes produce the symbols shown. Two of these codes' characteristics are noted here.

First, codes from different branches, $C_n(k)$, $C_m(k')$, such as code 504 and 508, are cyclic orthogonal to each other with the unit cyclic length ⇒, (2 in $C_2$ (2)) equal to the greatest common divisor (GCD) of (n, m), where m is the length of another code. In other words, $C'_n(i)$, which is formed by rotating $C_n(i)$ by a multiple of ⇒ positions, is still orthogonal to $C'_m(j)$ which is formed by rotation of $C_m(j)$ by a multiple of ⇒ positions. This property can be equivalently described as follows.

Without loss of generality it is assumed that m≧n. Compare code 504, where n=2, with code 510, where m=4. Codes $C_n(k)$ and $C_m(k')$ can be expressed $$k' \notin \left\{ \frac{(k-1)m}{n+1}, \frac{(k-1)m}{n+1}, \ldots, \frac{km}{n} \right\}$$

because they are in different branches. The cyclic orthogonality can be expressed as:

$$\sum_{i=1}^{n} C_m^i(k) C_m^{i+jn}(k') = 0, \text{ for each of } j = 0, 1, \ldots, \frac{m}{n-1}$$

where $C_m^i(k)$ denotes the $i^{th}$ chip of code $C_n(k)$.

Figure 6:
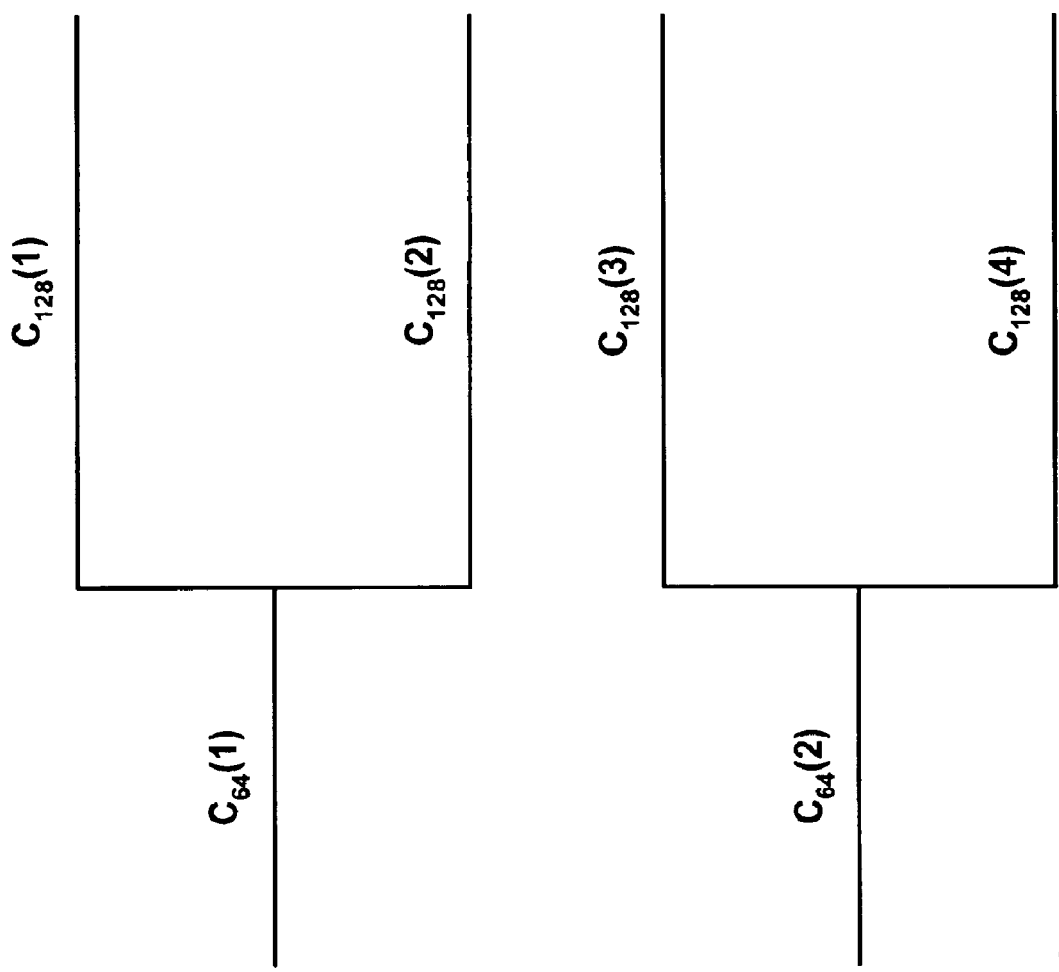
FIG. 6 is a diagram of a tree structure showing orthogonal and other branches.

Second, codes are not orthogonal if one is another's descendant. For instance, as seen in FIG. 6, $C_{64}(1)$ and $C_{128}(1)$ are not orthogonal, but $C_{64}(1)$ and $C_{128}(3)$ are orthogonal. This property can be expressed as below:

$$\sum_{i=1}^{n} C_m^i(k) C_m^{i+jn}(k') = \begin{cases} \neq 0, & \text{if } \frac{(k-1)m}{n} < k' \leq \frac{km}{n} \\ = 0, & \text{otherwise} \end{cases}$$

$$j = 0, 1, \ldots, \frac{m}{n-1}.$$

Due to the second property, when an OVSF code is assigned to a mobile user station 102, none of this code's descendants can be assigned to another mobile user station 102 (FIG. 1) in the cell in order to keep orthogonality among users. The base station 100 assigns a whole branch of OVSF codes at a certain tree level to a mobile user station 102 according to the channel's MAI and QoS requirement to meet constraints on data throughput, reliability, and delay. For non-realtime type applications with low bit error rate (BER) requirements such as File Transfer Protocol (FTP), a longer OVSF code (thus longer symbol duration) might be used to reduce the probability of re-transmission, and therefore increase the overall system's efficiency. For real-time types of applications that can tolerate relatively high BER such as voice, a shorter OVSF code might be used to efficiently use the channel resources while keeping acceptable quality.

The length of the OVSF codes depends on the QoS requirement and channel MAI. The shortest OVSF code assigned to a mobile user station 102 can be denoted as $C_n(k)$, k=1, 2, ..., n. Number n, which is a power of 2, corresponds to the maximum symbol rate that can be used by the mobile user station 102 assigned with this code. Once the base station 100 grants this OVSF code $C_n(k)$, none of its descendent code can be assigned to or used by another mobile user station 102 (to make codes of all users orthogonal). Thus, the user station 102 assigned with code $C_n(k)$ may be able to use codes that are descendants of $C_n(k)$ in the code tree in order to change the symbol rate dynamically. The receiving user station 102 must be able to detect the change of the symbol rate.

A simple rate detection algorithm for the use in the present invention will now be described. This algorithm engages "signal symbol averaging" on adjacent I-Q symbols. For this algorithm to function properly, there are two major requirements.

First, the signal points of consecutively transmitted symbols, $S_t$ and $S_{t+1}$ must not be opposite on the constellation I-Q diagram, i.e. the symbol $S_t$ is not equal to $-S_{t+1}$ when no rate change is made. In other words, the summation of these two signal points, symbol $S_t$ and symbol $S_{t+1}$, does not equal zero. This kind of symbol stream can be designed either using an asymmetric signal set or using convolution codes, as will be described.

A simple way to avoid consecutively transmitted symbols being opposite is to have a symbol set without opposite signal points on the I-Q plane, i.e., ∀(a,b),if a+bi∈S ⇒ −a−bi∉S, where S is the symbol set. Symbol set S can be produced by allocating each signal point on the I-Q plane asymmetrically.

Figure 7:
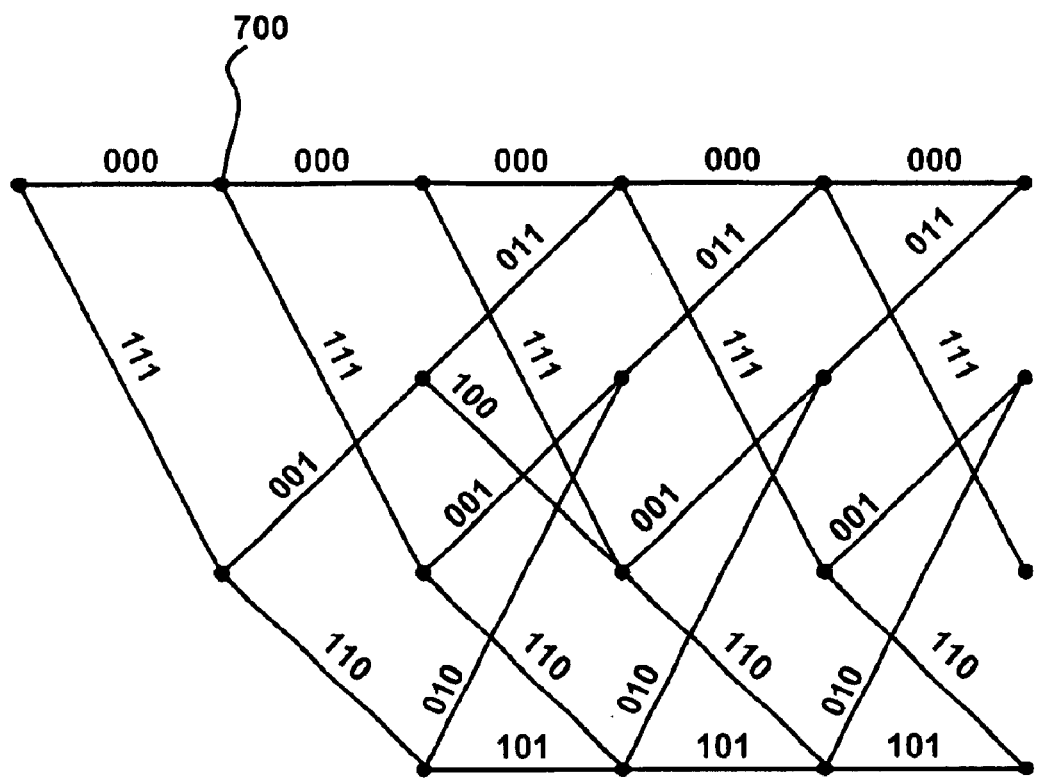
FIG. 7 is a diagram showing a trellis code modulation structure, suitable for rate adaptation without consuming overhead.

Trellis-coded modulation (TCM) can be designed to prevent the consecutively transmitted I-Q symbols from being opposite to each other. FIG. 7 illustrates a simple trellis code. The encoder, which uses sequential logic with constraint length K=3, accepts one input-bit and produces three output-bits. The generator vectors of the sequential logic are g1=[100], g2={100}, and g3={111} respectively.

Figure 8:
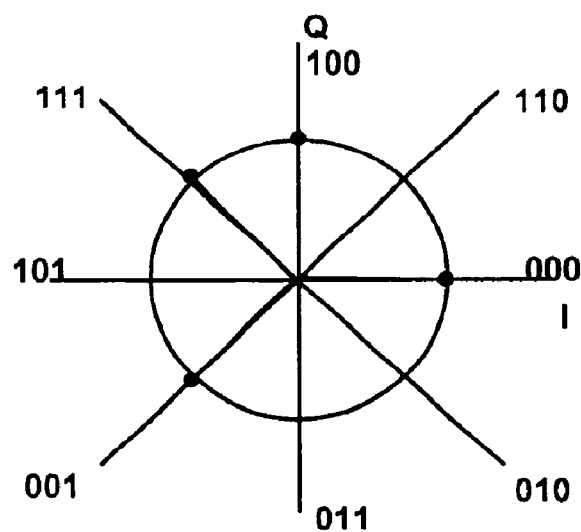
FIG. 8 is another diagram of signal points in an I-Q plane used in the modulation structure of FIG. 7.

The corresponding 8-PSK signal constellation mapping is shown in FIG. 8. This trellis code, for example, prevents the consecutively transmitted I-Q symbols from being opposite to each other. If, for example, the symbol [000] is detected at 700, the next symbol could be either [000], or [111]. Referring to FIG. 8, the signal point opposite to [000] is [101], which is not available in the trellis of FIG. 7. Thus, this opposite point cannot be reached. A careful design can simultaneously achieve low symbol error probability, as well.

Second, only particular descendants of the maximum-rate code, e.g. $C_n(k)$, can be used for rate adaptation. This algorithm requires that the transmitting base station 100 and receiving user station 102 use $C_{nq}(kq)$ for a symbol rate q times slower than the highest symbol rate granted, where a rate factor q can only be powers of 2. In other words, as an OVSF code with code length nq, code $C_{nq}(kq)$ in the code tree must be used.

Figure 9:
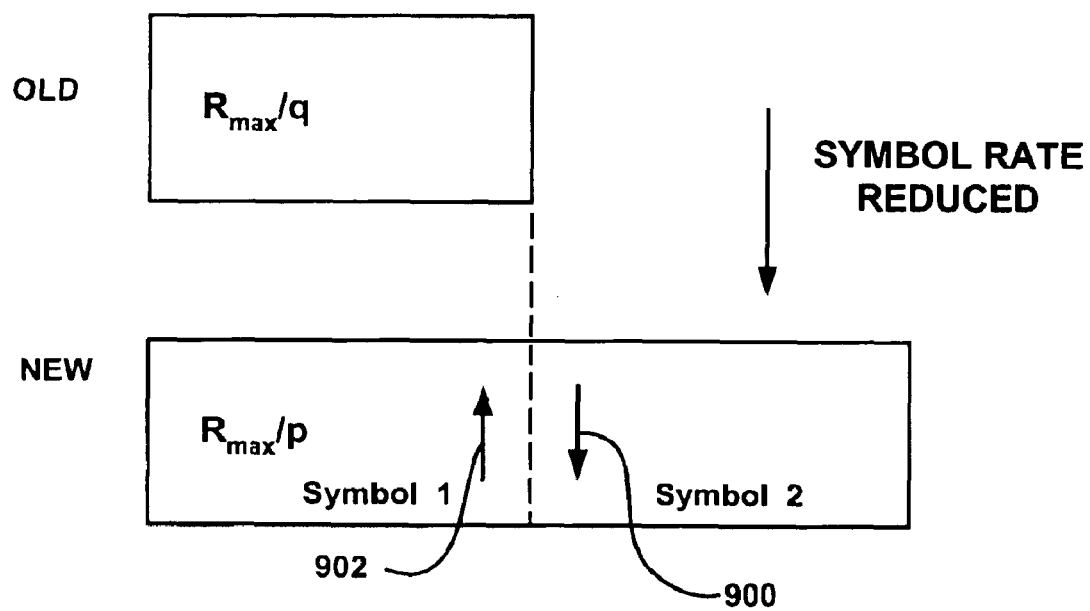
FIG. 9 is a diagram showing a reduction in symbol rate.

The receiving user station 102 performs symbol decoding by applying the OVSF code associated with the currently estimated symbol duration to each segment of the received signal estimated to be a symbol. To detect a transmitter reduced symbol rate (FIG. 9), i.e., that the transmitting base station 100 intends to reduce, or has reduced, the algorithm works as follows. Assume the current symbol rate $R_{current}$ is q times slower than the maximal symbol rate denoted as $R_{max}$, i.e. $R_{current}=R_{max}/q$. If the transmitting base station 100 decides to reduce symbol $S_i$'s symbol rate $R_{max}$ to $R_{max}/p$, it updates its code to $C_{np}(kp)$, which is generated by concatenating codes $C_{nq}(kq)$ and $-C_{nq}(kq)$ recursively. In other words, the transmitting base station 100 multiplies symbol $S_t$ with OVSF code $C_{np}(kp)$. In this case rate factor p is larger than rate factor q. The receiving user station 102 first applies its current code $C_{nq}(kq)$ to the first nq OVSF chips of symbol $S_i$ and decodes what the receiving user station 102 perceives as a symbol. Note that the transmitting base station 100 has made the duration of symbol $S_i$ longer than nq chips, so the actual symbol $S_i$ has not finished its duration at this point.

When the receiving user station 102 continuously uses $C_{nq}(kq)$ to decode the next nq OVSF chips' intervals of symbol $S_i$, what is perceived as the next symbol $S_{i+1}$ by the receiving user station 102 is an opposite signal point from what has been perceived as symbol 902 by the receiving user station on the I-Q plane. This is due to the structure of the OVSF code used by the transmitting base station 100 when expanding the symbol duration.

Opposite polarity of consecutively transmitted symbols contradicts design, i.e., signal points of adjacent symbols are never opposite signal points in the I-Q plane. Thus, when this event happens, the receiving user station 102 recognizes that it should update the OVSF code to the longer OVSF code $C_{n2q}(2kq)=[C_{nq}(kq)|-C_{nq}(kq)]$. The receiving user station 102 then uses this new OVSF code sequence for the next symbol decoding and iterates the previous operations until what are considered as the next two symbols are not opposite on the I-Q plane.

Figure 10:
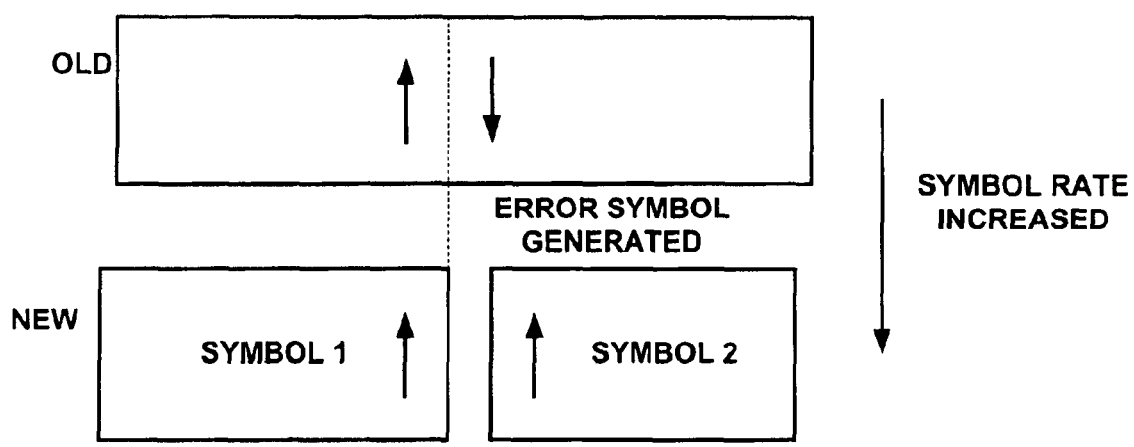
FIG. 10 is a diagram showing an increase in symbol rate.

If the transmitting base station 100 increases the symbol rate (FIG. 10), it reduces its OVSF code length to np, where p<q. In this case the transmitting base station 100 uses code $C_{np}(kp)$, and the receiving user station 102 still uses code $C_{nq}(kq)$, which is constructed recursively from $[C_{np}(kp)|-C_{np}(kp)]$. What is perceived as a detected symbol, $\rho$, by the receiving user station 102 with the duration of nq OVSF chips is in fact a sequence of multiple symbols transmitted by the transmitting base station 100. In this case detected symbol $\rho$ is not close enough to any signal points of the constellation in the I-Q plane to be considered a valid symbol.

When the average of these rate factors, q and p, is equal to $2^m$ an error symbol may be produced, although the consecutive symbols actually transmitted are never the opposite in the I-Q plane (symbol error). Also, the symbol constellation is designed such that averaging multiple signal points results in symbol error. In this case, the receiving user station 102 reduces the estimated symbol duration by half and tries the corresponding OVSF code. The receiving user station 102 performs this repeatedly until the estimated symbol duration and the corresponding OVSF code decodes a valid symbol. When the receiving user station 102 has decoded a valid symbol with $C_{nq}(kq')$ (e.g., code 512 in FIG. 5), the receiving user station 102 could further decode two halves of the corresponding signal portion with $C_{nq'/2}(kq/2')$ (code 504 in FIG. 5) each for robustness (such as better SNR/SIR). Then, these two nq'/2-chip outputs, denoted by detected symbol $\rho$ and detected symbol $\rho'$, must be opposite in the I-Q plane if the symbol rate is unchanged and should stop at $C_{nq}(kq)$ (code 512).

Figure 11:
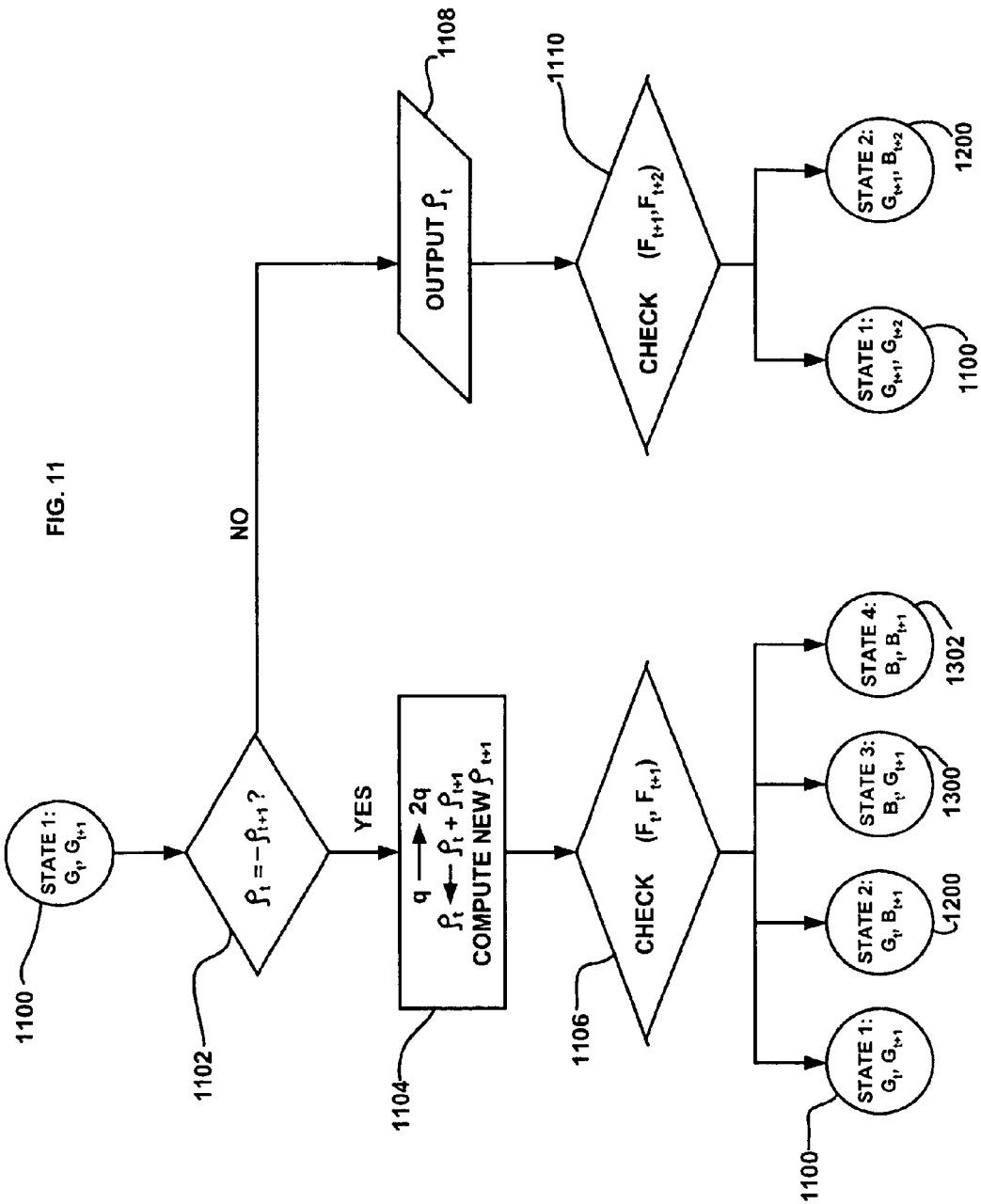
FIG. 11 is a state diagram of a portion of an algorithm used to adapt the symbol rate.
Figure 12:
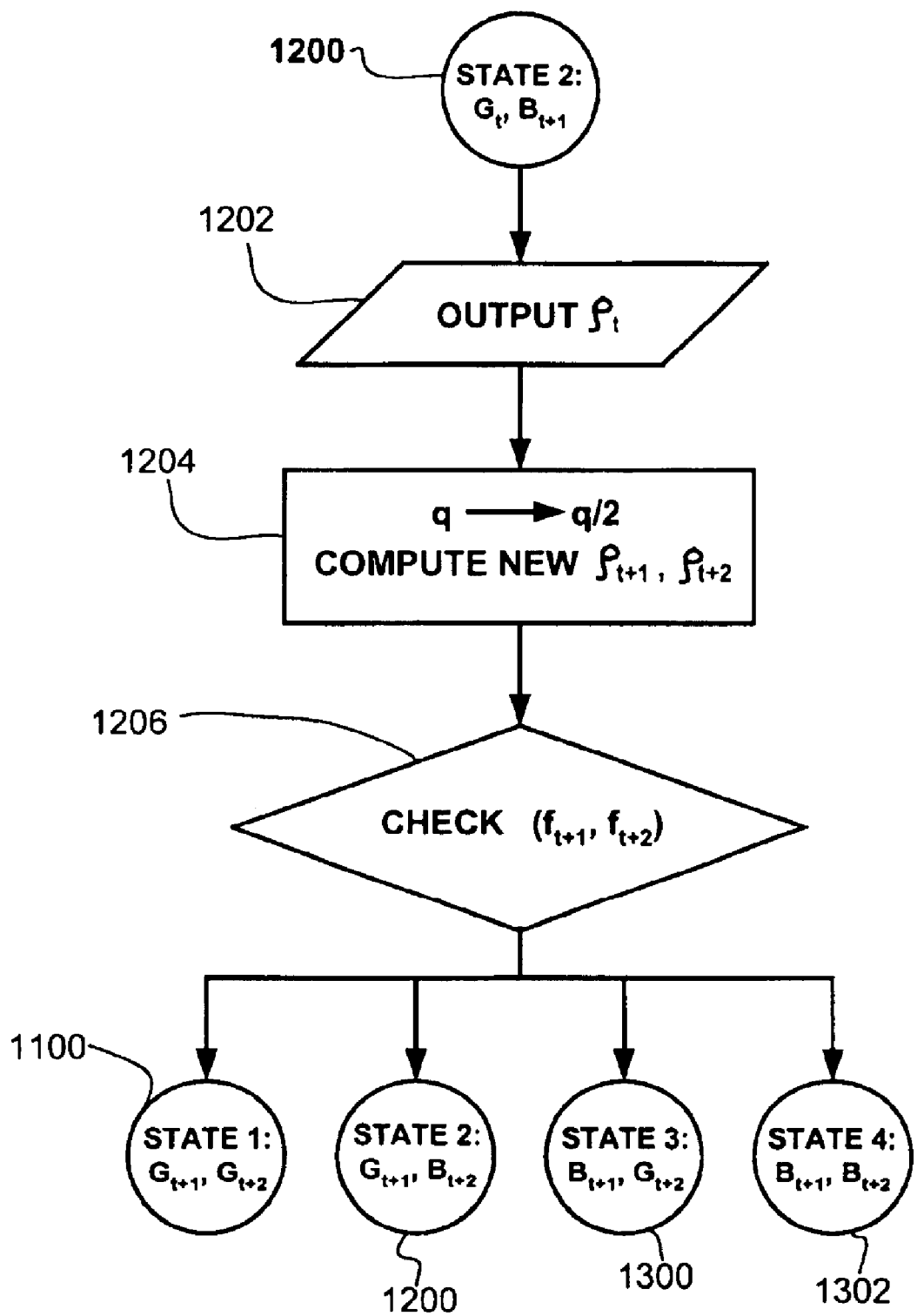
FIG. 12 is a state diagram of another portion of an algorithm used to adapt the symbol rate.
Figure 13:
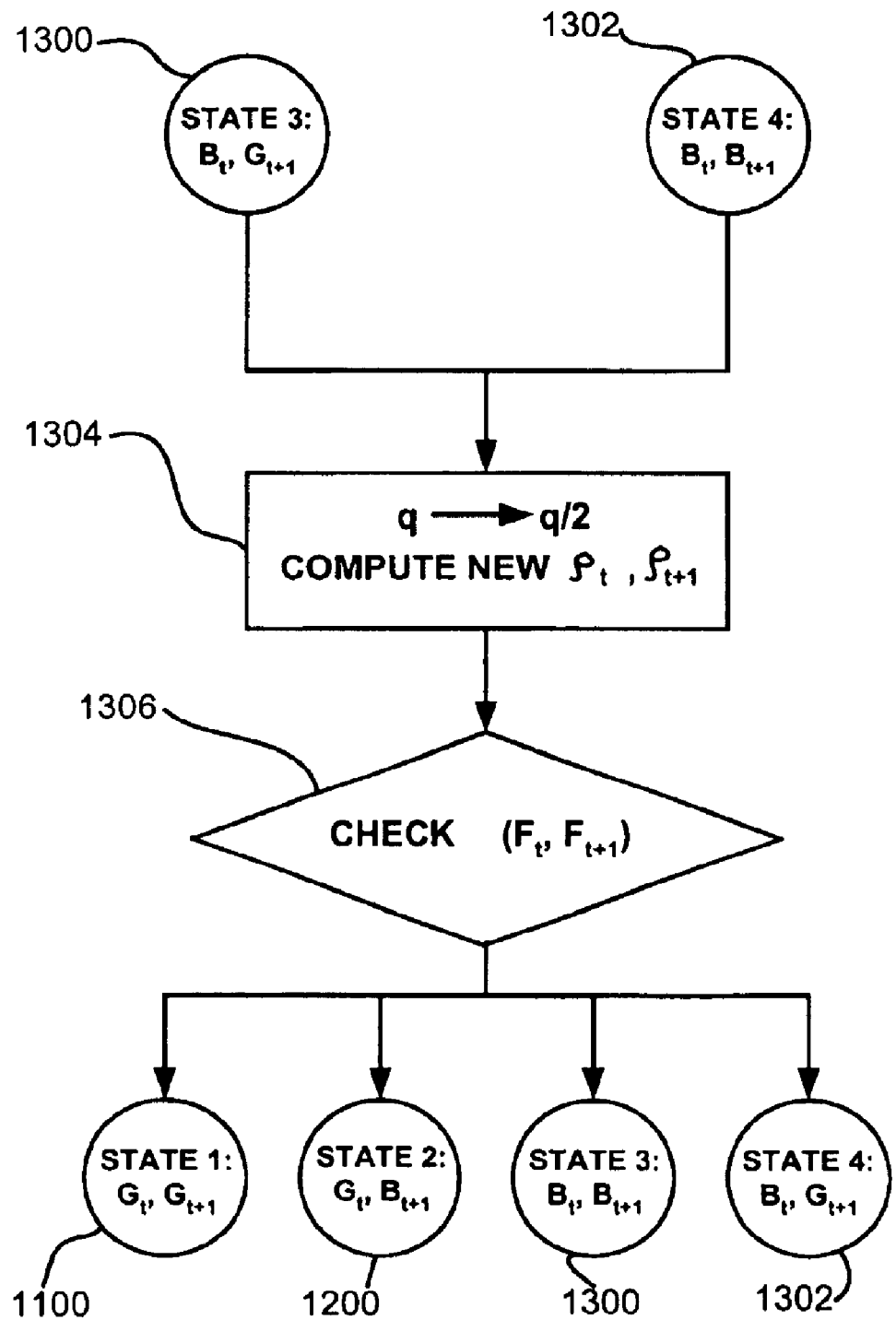
FIG. 13 is a state diagram of another portion of an algorithm used to adapt the symbol rate.

A more formal description of the rate detection algorithm is shown in FIGS. 11, 12 and 13. Each iteration starts at one of the four states: $(G_t,G_{t+1})$, $(G_t,B_{t+1})$, $(B_t,G_{t+1})$, $(B_t,B_{t+1})$, where G is a valid (good) symbol and B is an invalid (bad) symbol, and the t+1 symbol follows the t symbol in time. These are the four combinations of the states describing whether a perceived symbol is close enough to a signal constellation in the I-Q plane to be valid. Rate factor q indicates the current number of OVSF chips that the receiving user station 102 tries as the length of the symbol; namely, the current symbol length is nq OVSF chips.

$S_i$ (FIG. 4) denotes the portion of the received signal that the receiving user station 102 considers as the $i^{th}$ symbol transmitted. Rate factor q at each iteration means that the algorithm is considering the symbol duration of nq OVSF chips. If the algorithm is considering symbol $S_t$, then the length of symbol $S_t$, is nq OVSF chips for the current value of rate factor q. Note that as rate factor q is updated, the portion of the signal tried by the receiver changes as the symbols $S_t$ changes. The normalized correlation between $S_t$ and the OVSF code corresponds to the current value of rate factor q at the iteration. $F_t$ is defined as a binary variable flag {G,B} indicating whether detected symbol $\rho_t$ is a valid signal point of the constellation in the I-Q plane. When flag $F_t$ is represented as $G_t$, detected signal $\rho_t$ corresponds to a valid signal point. In FIGS. 11, 12, and 13, for simple notation $G_t$, $B_{t+1}$ denotes that a first signal is good and the signal following it in time is bad.

Referring again to FIG. 11, assuming an initial state 1100 of $G_t$, $G_{t+1}$, the algorithm determines whether detected signal $\rho_t$=is equal to the negative of detected value $\rho_t$ at step 1102. If so, the algorithm increases the value of rate factor q, such as 2q, and recomputes $\rho_{t+1}$. The output of the correlator, detected symbol $\rho_t$ plus detected symbol $\rho_{t+1}$, becomes detected symbol $\rho_t$, and a new detected symbol $\rho_{t+1}$ is computed at step 1104. The flags $F_t$ and $F_{t+1}$ are checked at 1106, and the result determines whether the algorithm returns to step 1100 (when both flags are good) or to step 1200 (FIG. 12), 1300 (FIG. 13) or 1302.

If detected symbol $\rho_t$ does not equal the negative of detected symbol $-\rho_{t+1}$ in step 1102, then detected symbol $\rho_t$ is good, and it is output at 1108. The flags $F_{t+1}$, $F_{t+2}$ are checked at step 1110, and the result of step 1110 determines whether the algorithm returns to step 1100, step 1200, step 1300 or step 1302.

If the system determines that the two symbols are in state 2 ($G_t$, $B_{t+1}$), the algorithm follows the steps shown in FIG. 12. The first detected symbol $\rho_t$ is output in step 1202. In step 1204, rate factor q is reduced by half, and detected symbol $\rho_{t+1}$ and detected symbol $\rho_{t+2}$ are computed. The state is checked again in step 1206, and the result is used to determine whether the system returns to step 1100, step 1200, step 1300 or step 1302.

The algorithm for states 3 and 4__(1300, 1302) is shown in FIG. 13. Since the first detected symbol $\rho_t$ is bad in both states, q is reduced by a factor such as one half, and detected symbol $\rho_t$ and detected symbol $\rho_{t+1}$ are computed in step 1304. The states are checked again in step 1306 to determine whether the system should return to step 1100, step 1200, step 1300, or step 1302.

Thus, when referring again to FIG. 11, if both the detected symbols are considered good, the first detected symbol ($\rho_t$) is output and the next two detected symbols are checked in step 1110. Thus, when there is no change in rate, the system goes from step 1100 to step 1102, to step 1108 on to step 1110, and returns to step 1100. If the rate changes though, the change is detected in step 1102, and the system goes to step 1104 and increases the current rate by decreasing rate factor q. Detected symbols $\rho_t$ and detected symbol $\rho_{t+1}$ are combined to create a new detected symbol $\rho_t$, and a new detected symbol $\rho_{t+1}$, which follows new detected symbol $\rho_t$. New detected symbol $\rho_t$ and new detected symbol $\rho_{t+1}$ are computed in step 1104. If the flags $F_t$ and $F_{t+1}$ are found to satisfy state 1, then the receiving user station 102 has found a correct current rate $R_{current}$ and the system returns to step 1100. If the symbol length has not been increased enough, both symbols may still be checked as good, even if adjacent symbols are not opposite, and the system will return again to step 1100. If the symbols are not opposite, that will be detected again in 1102, and rate factor q will be doubled again. That process will be repeated until adjacent points are not opposite.

Increasing the rate factor q in step 1104 suggests that current rate $R_{current}$ has been decreased. If, in fact, current rate $R_{current}$ has been increased, the result of step 1106 will be either state 2, state 3 or state 4.

If the current rate $R_{current}$ changed again immediately, then state 2 would be detected. If, after increasing the rate factor q, it is determined that the first detected symbol $\rho_t$ is bad, then states 3 or 4 would be detected.

In FIG. 11, the first assumption is that the current rate $R_{current}$ has been reduced. If, in fact, it has been increased, the step 1106 will generate state 3 or state 4, and rate factor q will be reduced. Since the second detected symbol $\rho_{+1}$ is bad in state 2, the first detected symbol $\rho_t$ is output at step 1202 and the system processes the second detected symbol $\rho_{t+1}$. If the first detected symbol $\rho_t$ is bad, as in steps 1300 and 1302, the system recomputes the first detected symbol $\rho_t$ and continues.

Referring again to FIG. 11, when the system is in state 1 and step 1102 produces a NO result, the first detected symbol $\rho_t$ is output, and the next detected symbol $\rho_{t+1}$ is checked in step 1110. The next detected symbol $\rho_{t+2}$ is used in step 1110. If $G_{t+2}$ is good, the system returns to step 1100. If $G_{t+2}$ is bad, step 1200 in FIG. 12 is entered.

In FIG. 12, the output, detected symbol $\rho_t$, is identified in step 1202. In step 1204, rate factor q is divided by 2, and detected symbol $\rho_{t+1}$ and detected symbol $\rho_{t+2}$ are computed. The new outputs, detected symbol $\rho_{t+1}$ and detected symbol $\rho_{t+2}$, are checked in step 1206 and resulting flags $F_{t+1}$ and $F_{t+2}$ determine whether the algorithm enters state 1, state 2, state 3 or state 4.

In FIG. 13, the first flag $F_t$ indicates a bad output in both state 3 (1300) and state 4 (1302). In step 1304, rate factor q is divided by 2, and detected symbol $\rho_t$ and detected symbol $\rho_{t+1}$ are computed. The outputs, detected symbol $\rho_t$ and detected symbol $\rho_{t+1}$, are checked at step 1306, and the resulting flags $F_t$ and $F_{t+1}$, determine whether the algorithm enters state 1, state 2, state 3, or state 4.

While the various embodiments of the application have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A communication station comprising a receiver, a transmitter and at least one antenna, including:

means for orthogonally decoding data received from another communication station, the data having been encoded in a plurality of packets, each packet having a plurality of signal points in a field, the signal points of consecutively transmitted symbols being correlated unless a symbol rate is changed, the data having been further encoded such that only orthogonal descendants of a selected maximum rate code are used for communications with the communication station, means for identifying the signal points of consecutively transmitted symbols in the decoded data and recognizing a change in the rate of data transmission when the signal points of consecutively transmitted signal points are not correlated, and wherein two consecutive symbols $\rho_t$ and $\rho_{t+1}$ are decoded at a first symbol rate when the data is decoded, (b) if both symbols $\rho_t$ and $\rho_{t+1}$ are considered valid, both symbols $\rho_t$ and $\rho_{t+1}$ are decoded to determine whether they are correlated; (c) if the symbols $\rho_t$ and $\rho_{t+1}$ are not correlated, then the first symbols are not correlated, then the first symbol $\rho_t$ is output and the symbols $\rho_{t+1}$ and a following symbol $\rho_{t+2}$ are decoded; and (d) if both symbols $\rho_{t+1}$ and $\rho_{t+2}$ are considered valid, designating the symbols $\rho_{t+1}$ and $\rho_{t+2}$ as the symbols $\rho_t$ and $\rho_{t+1}$ and repeating steps (b), (c) and (d), unless consecutive symbols are correlated.

2. The communication station of claim 1, wherein (e) if the symbols $\rho_t$ and $\rho_{t+1}$ are not correlated, then the first symbol rate q is doubled so that $\rho_t$ and $\rho_{t+1}$ are decoded as a single symbol $\rho'_t$ and a second symbol $\rho'_{t+1}$ based on the symbol rate 2q is decoded; if both symbols $\rho'_t$ and $\rho'_{t+1}$ are valid, then designating the repeating steps (b), (c) and (d).

3. The communication station of claim 1, wherein if the symbol $\rho_{t+1}$ is considered valid and the symbol $\rho_{t+2}$ is considered invalid in step (d), then the symbol $\rho_{t+1}$ is designated $\rho_t$ and is output, the first symbol rate q is reduced to q/2 and a new symbols $\rho'_{t+1}$ and $\rho'_{t+2}$ are computed from $\rho_{t+2}$, $\rho'_{t+1}$ and $\rho'_{t+2}$ are decoded, and processed further depending on whether $\rho'_{t+1}$ and $\rho'_{t+2}$ are valid or invalid.

4. The communication station of claim 1, wherein if the symbol $\rho_{t+1}$ is considered invalid in step (d), then the first symbol rate q is reduced to q/2 and $\rho_t$ is decoded as $\rho'_t$ and $\rho'_{t+1}$, $\rho'_t$ and $\rho'_{t+1}$ are checked, and are processed further depending on whether they are valid or invalid.

5. A communication station comprising a receiver, a transmitter and at least one antenna, including:

a decoder which orthogonally decodes data received from another communication station, the data having been encoded in a plurality of packets, each packet having a plurality of signal points in a field, the signal points of consecutively transmitted symbols being correlated unless a symbol rate is changed, the data having been further encoded such that only orthogonal descendants of a selected maximum rate code are used for communications with the communication station, a detector which identifies the signal points of consecutively transmitted symbols in the decoded data and recognizes a change in the rate of data transmission when the signal points of consecutively transmitted signal points are not correlated, and wherein (a) two consecutive symbols $\rho_t$ and $\rho_{t+1}$, are decoded at a first symbol rate when the data is decoded, (b) if both symbols $\rho_t$ and $\rho_{t+1}$ are considered valid, both symbols $\rho_t$ and $\rho_{t+1}$ are decoded to determine whether they are correlated; (c) if the symbols $\rho_t$ and $\rho_{t+1}$ are not correlated, then the first symbols are not correlated, then the first symbol $\rho_t$ is output and the symbols $\rho_{t+1}$ and a following symbol $\rho_{t+2}$ are decoded; and (d) if both symbols $\rho_{t+1}$ and $\rho_{t+2}$ are considered valid, designating the symbols $\rho_{t+1}$ and $\rho_{t+2}$ as the symbols $\rho_t$ and $\rho_{t+1}$ and repeating steps (b), (c) and (d), unless consecutive symbols are correlated.

6. The communication station of claim 5, wherein (e) if the symbols $\rho_t$ and $\rho_{t+1}$ are not correlated, then the first symbol rate q is doubled so that $\rho_t$ and $\rho_{t+1}$ are decoded as a single symbol $\rho'_t$ and a second symbol and $\rho'_{t+1}$ based on the symbol rate 2q is decoded; if both symbols $\rho'_t$ and $\rho'_{t+1}$ are valid, then designating the repeating steps (b), (c) and (d).

7. The communication station of claim 5, wherein if the symbol $\rho_{t+1}$ is considered valid and the symbol $\rho_{t+2}$ is considered invalid in step (d), then the symbol $\rho_{t+1}$ is designated $\rho_t$ and is output, the first symbol rate q is reduced to q/2 and a new symbols $\rho'_{t+1}$ and $\rho'_{t+2}$ are computed from $\rho_{t+2}$, $\rho'_{t+1}$ and $\rho'_{t+2}$ are decoded, and processed further depending on whether $\rho'_{t+1}$ and $\rho'_{t+2}$ are valid or invalid.

8. The communication station of claim 5, wherein if the symbol $\rho_{t+1}$ is considered invalid in step (d), then the first symbol rate q is reduced to q/2 and $\rho_t$ is decoded as $\rho'_t$ and $\rho'_{t+1}$, $\rho'_t$ and $\rho'_{t+1}$ are checked, and are processed further depending on whether they are valid or invalid.

* * * * *